United States Patent [19]

Franssen et al.

[11] 4,221,928

[45] Sep. 9, 1980

[54] NOISE REDUCTION CIRCUIT FOR STEREO SIGNALS

[75] Inventors: Nico V. Franssen; Mathias H. Geelen, both of Eindhoven, Netherlands

[73] Assignee: U.S. Philips Corporation, New York, N.Y.

[21] Appl. No.: 972,587

[22] Filed: Dec. 22, 1978

[30] Foreign Application Priority Data

Jan. 25, 1978 [NL] Netherlands .................. 7800871

[51] Int. Cl.² ............................................. H04H 5/00
[52] U.S. Cl. ........................... 179/1 GM; 179/1 GD
[58] Field of Search ............. 179/1 GM, 1 GJ, 1 GD, 179/1 G, 100.4 ST, 1 GQ; 325/36

[56] References Cited

U.S. PATENT DOCUMENTS

| | | | |
|---|---|---|---|
| 3,264,414 | 8/1966 | Santilli et al. | 179/1 GM |
| 3,823,268 | 7/1974 | Modafferi | 179/1 GJ |
| 3,825,697 | 7/1974 | Cornell et al. | 179/1 GJ |
| 4,029,906 | 6/1977 | Takahashi | 179/1 GJ |
| 4,037,057 | 7/1977 | Ogita et al. | 179/1 GJ |

Primary Examiner—Douglas W. Olms
Attorney, Agent, or Firm—Thomas A. Briody; William J. Streeter; Edward W. Goodman

[57] ABSTRACT

Noise reduction circuit for stereo signals comprising a control input terminal, first and second outputs as well as a controllable coupling circuit for a controllable mutual signal coupling between the two outputs, the two outputs being decoupled from one another only during those sound passages wherein an effective aftereffect of a stereo impression is produced to obtain an optimal combination of noise level and stereo effect.

7 Claims, 4 Drawing Figures

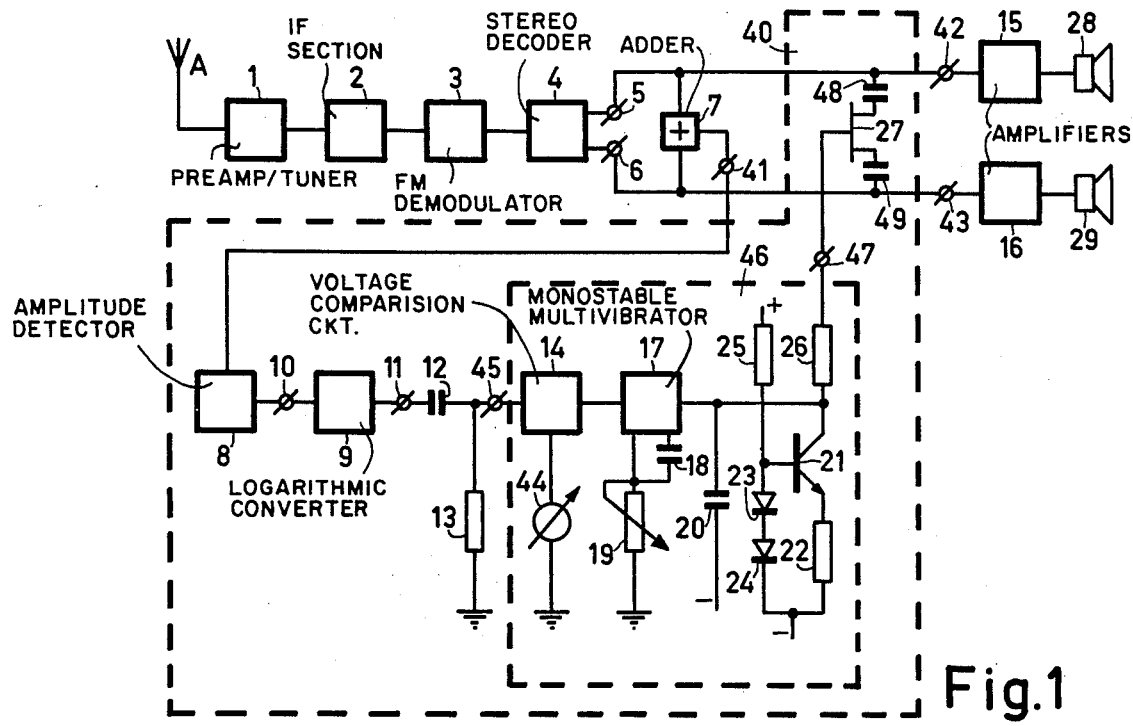
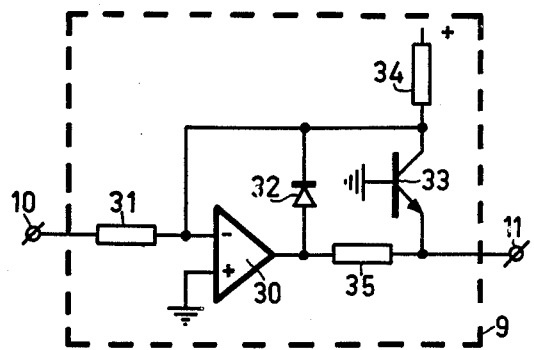
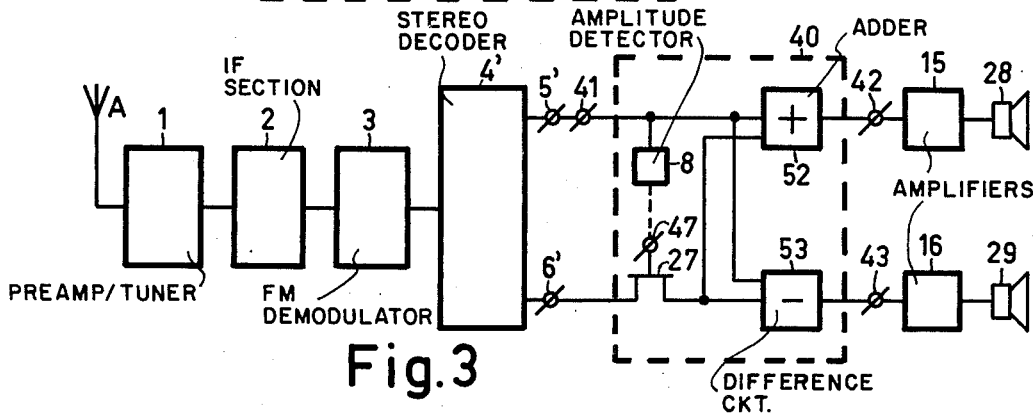

NOISE REDUCTION CIRCUIT FOR STEREO SIGNALS

BACKGROUND OF THE INVENTION

The invention relates to a noise reduction circuit for stereo signals comprising a control input terminal, first and second outputs as well as a controllable coupling circuit for a controllable mutual signal coupling between the two outputs.

Such a noise reduction circuit is disclosed in German patent application No. 24, 10 430, which has been laid open to public inspection. The noise which may be audible when reproducing stereophonic sound signals can be reduced by changing over to a more or less monophonic reproduction. In the known noise reduction circuit this procedure is used for reducing the noise impression during soft sound passages wherein the amplitude of the sound signal is below a certain preset fixed threshold value. The signal coupling between the two outputs is then maximal. During loud sound passages wherein the amplitude of the sound signal exceeds said threshold value the two outputs are decoupled from one another, which results in a stereophonic reproduction. So with the prior art noise reduction circuit the spatial stereo effect disappears during the soft sound passages, whereas the noise may disturb the stero reproduction in an annoying manner during the loud sound passages.

SUMMARY OF THE INVENTION

It is an object of the invention to provide noise reduction circuit which enables sound reproduction with a more or less continuous spatial stereo effect, the noise not only being reduced during soft sound passages but also during loud sound passages with respect to the noise which would occur in case of a full, continuous stereo reproduction.

A noise reduction circuit according to the invention, of the type defined in the preamble, is therefore characterized in that the control input terminal is connected via an amplitude detector to a differentiator which is connected to a control input of the controllable coupling circuit for minimizing said signal coupling when the amplitude of the output signal of the amplitude detector increases, followed by and automatic maximization of the signal coupling after the amplitude increase.

The dissertation "Some considerations on the mechanism of directional hearing " by N.V. Franssen published at Delft on July 6, 1970 describes listening tests in which it appears that a signal of a constant frequency which is reproduced via a first loudspeaker at full strength during the attacks, immediately followed by a gradual decrease in volume to zero level and being at the same time gradually reproduced at full strength via a second loudspeaker is perceived for a certain period of time as having been produced by the first loudspeaker.

The invention is based on the recognition that the impression of the direction obtained when hearing a sound signal each time this sound strikes up continues for some time after each attack, even if the sound signal is reproduced from a different position immediately after the attacks.

When applying the measure according to the invention the two outputs of the noise reduction circuit are decoupled from one another during the attacks and a stereophonic reproduction is obtained. After each attack has ended the two outputs are mutually coupled, which results in an identical signal at both outputs, namely the sum signal of the left hand and the right hand signal components L+R of the stereo signal, resulting in a monophonic reproduction accompanied by a considerable decrease of the noise.

In practice the spatial impression of stereophonic reproduction, such as it is produced during the attacks, appears to linger for some time on the ear after each attack, when actually a mono reproduction may be taking place. With normal stereophonic speech and musical signals, this gives a more or less continuous impression of stereo reproduction, while actually, the reproduction is monophonic during the major part of the time. As a consequence the total average noise level may be considerably lower than for a continuous stereo reproduction.

A preferred embodiment of a noise reduction circuit according to the invention is characterized in that a control signal shaper, having a threshold, is connected between the differentiator and the controllable coupling circuit for producing a control signal when its threshold voltage is exceeded, which control signal activates the controllable coupling circuit and adjusts the signal coupling from a maximum level to a minimum level, maintains the signal coupling, at least for a first period of time, at the minimum level and readjusts it during at least a second period of time from the minimum level to the maximum level, said periods of time corresponding to at least a plurality of times of the period of the lowest signal frequency in the stereo signals and their sum being at least 10 msec.

When this measure is applied, the controllable coupling circuit is not activated, at a proper choice of the threshold voltage of the control signal shaper, at those attacks which are accompanied by a small amplitude variation and/or wherein the amplitude increases only gradually. These attacks are reproduced monophonically so that the total average noise level is decreased without noticeably affecting the impression of a stereophonic reproduction. The remaining attacks initiate a change-over from monophonic reproduction to stereophonic reproduction, which stereophonic reproduction is maintained during the first period of time in order to be able to effect an impression of a stereophonic reproduction with a sufficient after-effect. If, however, the stereophonic reproduction is suddenly changed to a monophonic reproduction after the first period of time, it appears that this is perceived as a fresh attack which is now monophonically reproduced. This monophonic attack may wholly or partly cancel the lingering impression of stereo reproduction. This is prevented by effecting the stereo-mono change-over gradually during the second period of time after the first period of time has ended.

In practice it appeared to be advantageous for the continuity of the stereo impression to have the first as well as the second period of time to continue for, at least some times, the time of period of the lowest signal frequency to be reproduced and to give their sum a length of at least 10 msec.

A further preferred embodiment of a noise reduction circuit according to the invention is characterized in that the control signal shaper, having a threshold, comprises a cascade arrangement of a voltage comparison circuit having a voltage reference source for forming a threshold voltage, a monostable multivibrator for generating, when the threshold voltage is exceeded, a control pulse having a pulse duration corresponding to the first period of time, an output of the monostable multivibrator being provided with a parallel capacitor and a controllable current source for discharging the capacitor during the second period of time, the output of the monostable multivibrator being connected to the control input of the controllable coupling circuit.

When applying this measure, a simple implementation of the control signal shaper, having a threshold, is possible. Optionally the voltage reference source and-/or the monostable multivibrator may be of a controllable implementation to control, dependent on the signal-to-noise ratio of the stereo siganls, the threshold voltage and/or the pulse duration of the monostable multivibrator, so that the total period of stereophonic reproduction can be continuously prolonged and shortened, respectively, at a decreasing and increasing noise level, repectively.

A further embodiment of a noise reduction circuit according to the invention is characterized in that a logarithmic converter is connected between the amplitude detector and the differentiator for supplying an output signal whose amplitude variation is in a logarithmic ratio to the amplitude variation of the input signal applied to the logarithmic converter. As the audibility of an attack depends on the relative rather than on the absolute increase in the sound amplitude by which the attack is accompanied, the differentiator receives, when said last measure is applied, a signal, the magnitude of whose amplitude variations indicates the audibility of the attacks. The magnitude of these amplitude variations is directly reflected in the magnitude of the amplitude of the differentiator output pulses. By means of proper choice of the threshold voltage of the monostable multivibrator, it it possible to distinguish, in a simple manner, audible attacks, the stereophonic reproduction of which is desired, from less audible attacks which can be reproduced without any drawbacks in a monophonic manner.

A further embodiment of such a noise reduction circuit is characterized in that the logarithmic converter comprises a voltage-controlled current source, connected to the amplitude detector, an output of this source being shunted by means of a semiconductor junction, which semiconductor junction is arranged in parallel with an input of the differentiator.

When applying this measure, a simple realization of a logarithmic converter becomes possible.

A still further embodiment of a noise reproduction circuit according to the invention is characterized in that the input signal of the amplitude detector is the sum signal of the left hand sound signal of the stereo signal.

According to this measure said sum signal L+R is taken as the detection signal for the attacks because interferences, showing great similarity with the sound attacks, occur in practice less frequently in said sum signal than in the difference signal or in each of the two sound signals of the stereo signal.

Another embodiment of a noise reduction circuit according to the invention is characterized in that said signal coupling between the two outputs for frequencies below a fixed threshold frequency is constant and minimal and controllable for frequencies thereabove.

In general, the directional effect of a stereo reproduction is predominantly created by the sound signals in the lower frequency band and the noise level at stereo reproduction is relatively greater for higher frequencies than for lower frequencies. When applying said last measure, the signals having a frequency below the threshold frequency are continuously reproduced stereophonically, whereas the signals having a frequency thereabove are only reproduced stereophonically during the attacks.

DESCRIPTION OF THE DRAWINGS

The invention will now be further explained by way of non-limitative example with reference to the figures shown in the drawings.

Herein:

FIG. 2 shows a practical embodiment of a logarithmic converter for a noise reduction circuit according to the invention, FIG. 3 shows another embodiment of a noise reduction circuit according to the invention.

DESCRIPTION OF THE PREFERRED EMBODIMENTS

Figure 1A:
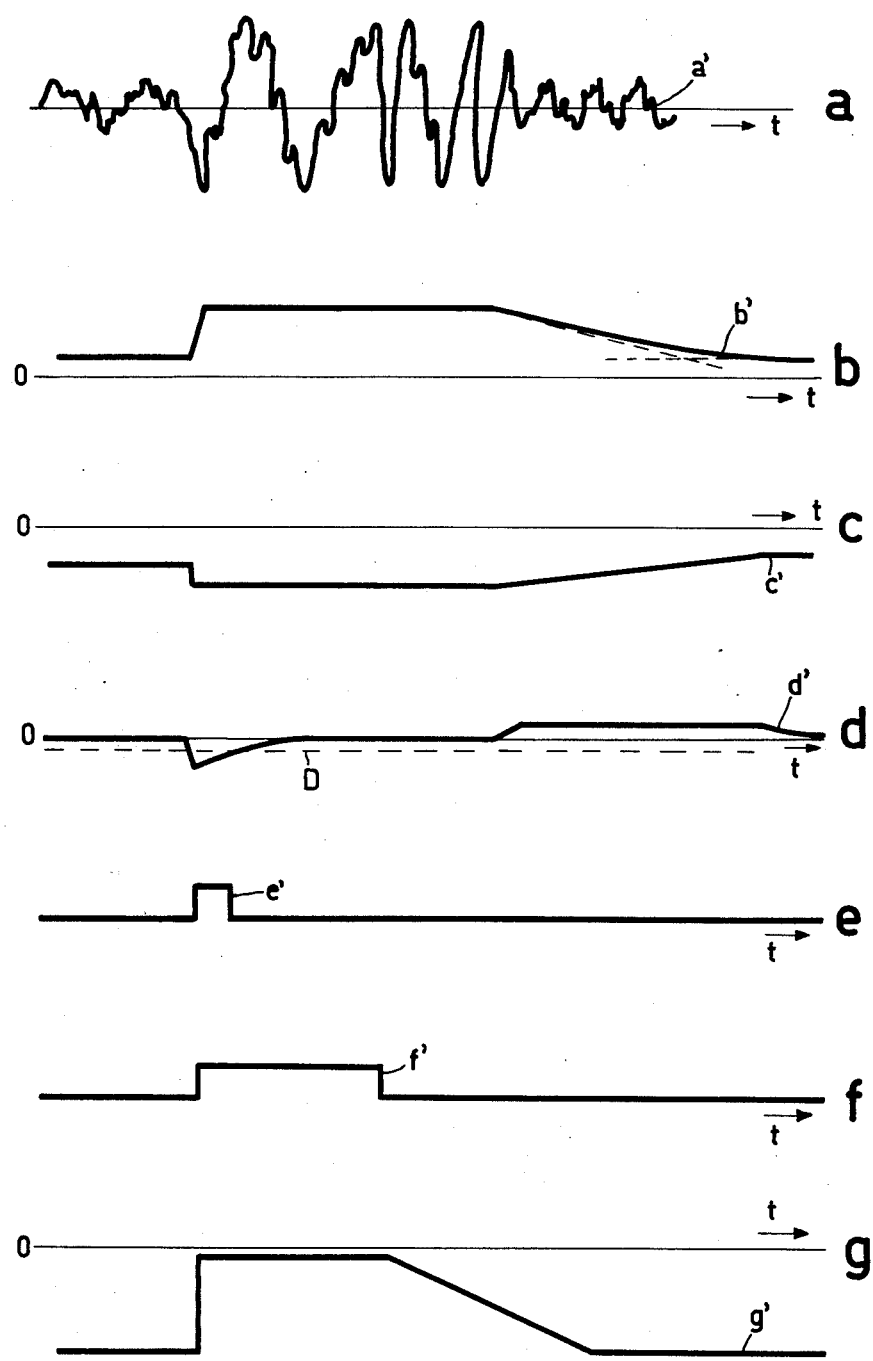
FIG. 1 shows an FM receiver having a noise reduction circuit according to the invention and FIG. 1A, graphs a to g inclusive, shows the signal characteristics at different points in the noise reduction circuit shown.

FIG. 1 shows an FM receiver comprising a preamplifier-tuning unit 1 connected to an aerial A and connected, sequentially, to an intermediate frequency section 2, an FM demodulator 3 and a stereo decoder 4 having left hand and right hand audio frequency outputs 5 and 6, respectively. In a known manner a desired FM stereo signal is selected in said circuit from the HF signals received at the aerial A and processed further, resulting in an audio frequency stereo signal at the outputs 5 and 6 of the stereo decoder 4. The respective outputs 5 and 6 are coupled, via amplifiers 15 and 16, to loudspeakers 28 and 29 for amplifying and reproducing, respectively, the left hand and right hand signals, L and R, of the stereo signal.

For a controllable mutual signal coupling, the outputs 5 and 6 are connected to outputs 42 and 43, respectively, of a noise reduction circuit 40 according to the invention. Via an adder circuit 7, the outputs 5 and 6 are also connected to a control input terminal 41 of the noise reduction circuit 40. In the adder circuit 7 a sum signal a' is formed from the left hand and the right hand signals of the audio frequency stereo signal which in practice appeared to be eminently suitable for detecting attacks of the stereo signal. This audio frequency sum signal a', a possible variation of which is shown in graph a, is rectified in an amplitude detector 8, connected to the control input terminal 41 of the noise reduction circuit 40 and detected with a certain time constant.

The sum signal b', detected thus, having a variation as shown in graph b is applied, via an output of the amplitude detector 8, to an input 10 of a logarithmic converter 9. The logarithmic converter 9 supplies, at an output 11, an output signal c' as shown in graph c, the mangitude of whose amplitude variations is proportional to the relative amplitude variations in the last detected sum signal b'. As the audibility of an attack is determined by the relative amplitude increase of the sound signal, the output signal c' of the logarithmic converter 9 gives, by means of the absolute magnitude of its amplitude increase, a direct indication of the audibility of the attacks. By differentiating this output signal c' in a differentiator 12, 13 coupled to the output 11, more or less pulse-shaped signals d' are obtained, which are shown in graph d, and whose amplitudes correspond to the degree of audibility of the attacks. The differentiator 12, 13 consists of a series arrangement of a capacitor 12, coupled to the output 11, and a resistor 13, connected to ground.

Said pulse-shaped signals d' are supplied at the output of the differentiator 12, 13, or at the connection of the capacitor 12 to the resistor 13, and are applied via an input 45 to a control signal shaper 46, having a threshold.

The control signal shaper 46 comprises a cascade arrangement of a voltage comparison circuit 14, connected to the input 45 and provided with a controllable voltage reference source 44, a monostable multivibrator 17 connected to an adjustable RC member 18, 19. An output of the monostable multivibrator 17 is provided with a parallel capacitor 20 and a controllable current source 21 to 25 inclusive and connected via a matching resistor 26 to a control input 47 of a controllable coupling circuit 27. The controllable coupling circuit 27 consists of a FET, the control electrode of which is connected to the via control input 47 and whose source and drain are connected, via capacitors 48 and 49 to the outputs 42 and 43, respectively, of noise reduction circuit 40.

The voltage of the voltage reference source 44 determines the threshold voltage which is indicated by D in graph d. If the pulse-shaped signals d' exceed this threshold voltage D, a pulse e' appears at the output of the voltage comparison circuit 14 as shown in graph e. The pulse e' activates the monostable multivibrator 17 which results in a pulse f' shown in graph f, which has a pulse duration determined by the time constant of the adjustable RC elements 18, 19. The pulse duration corresponds to the previously mentioned first period of time.

The voltage across the capacitor 20 arranged between a first voltage source and the output of the monostable multivibrator 17 follows, owing to a rapid charge time constant, rather accurately the variation of the pulse f', however, only to its falling edge. The voltage of capacitor 20 can only be reduced to its original value, i.e. the value prior to the ocurrings of the pulse f', by a charge transfer via the controllable current source 21 to 25 inclusive. To this end the controllable current source 21 to 25 inclusive comprises a transistor 21, the collector of which is coupled to the connection between the capacitor 20 and the output of the monostable multivibrator 17 and whose emitter is connected via an emitter resistor 22 to the first voltage source. The base of the transistor 21 is connected on the one hand via a supply resistor 25 to a second voltage source and on the other hand via a series arrangement of two diodes 23 and 24 to the first voltage source.

During the occurrence of the pulse f' transistor 21 conducts, the collector-emitter current being determined by the quotient of the voltage across one of the two diodes 23 and 24 and the value of the transistor 22. The output of the monostable multivibrator 17 is sufficiently low-ohmic to prevent the voltage from decreasing during the occurrence of the pulse. After the pulse has ended, at the falling edge thereof, the voltage across the capacitor 20 decreases linearly owing to said collector-emitter current and, consequently, also the collector-emitter voltage of transistor 21, until the latter becomes saturated. The capacitor 20 voltage has then arrived at its original value again. The period of time in which the decrease of the capacitor 20 voltage occurs is determined by $V_cC/I$, $V_c$ being the capacitor 20 voltage during the occurrence of the pulse f', I the collector-emitter current of the transistor 21 in the conductive state, and C the capacitance valve of the capacitor 20. This period of time corresponds to the previously mentioned second period of time. After this period of time, the controllable current source is out of operation until a next pulse f' increases the collector voltage again, so that the transistor 21 is brought out of its saturated state.

Graph g shows the variation of the capacitor voltage g' thus obtained. This capacitor voltage g' is applied, via the matching resistor 26, to the control input 47 of the controllable coupling circuit 27. By way of the source-drain path through the FET, which functions as the controllable coupling circuit 27, a signal impedance is realised, the magnitude of which decreases at an increasing negative capacitor voltage g' and vice versa. At the occurence of an audible sound attack, the signal coupling is consequently suddenly reduced to a minimum level, resulting in a sudden change-over from monophonic reproduction of the sum signal L+R at the loudspeakers 28 and 29 to a stereophonic reproduction, the left hand sound signal L being reproduced via a loudspeaker 28 and the right hand sound signal R via the loudspeaker 29. After the transient reduction, the signal coupling is maintained during the first period of time or during the pulse duration of the pulse f', as the case may be, at this minimum level and increased during the second period of time or $V_cC/I$, as the case may be, resulting in a gradual change-over from stereophonic reproduction to the original monophonic reproduction.

In practice it may be advantageous to control the whole duration of stereophonic reproduction in dependence on the signal-to-noise ratio of the received signal. This enables at an increasing and decreasing, respectively, quality of reception a gradual change to a full stereophonic reproduction and monophonic reproduction, respectively.

To this end, the signal-to-noise ratio of the received signal must be measured, for example in the FM demodulator 3, and be converted into a control signal. The value of the controllable resistor 19 can be increased by means of this control signal at an increasing signal-to-noise ratio, so that the duration of the stereophonic reproduction per sound attack is prolonged and/or the voltage of the voltage reference source 44 is reduced, so that a change-over to stereophonic reproduction is initiated more frequently and vice versa.

It may also be advantageous to reproduce the signals below a certain threshold frequency as far as possible in a continuously stereophonic manner, so that a directional effect is retained as much as possible and to effect the noise reduction, such as it is obtained by means of the noise reduction circuit 40, as much as possible only on the signals above this threshold frequency. This is achieved by means of the capacitors 48 and 49, each of which constitutes, together with the internal resistance of the stereo decoder 4 and the respective outputs 5 and 6, a RC element, the RC time of which determines the threshold frequency.

In a practical implementation the amplitude detector 8 as well as the logarithmic converter 9 and the voltage comparison circuit 14 were provided with operational amplifiers of the type TBA 221 and the monostable multivibrator 17 with an integrated circuit of the type HEF 4528. The time constant of the differentiator 12, 13 was approximately 2.7 msec, and the time constant of the adjustable RC element 18, 19 was not more than approximately 220 msec. An adjustment of last-mentioned RC element 18, 19 to a time constant of 40 msec appeared to be acceptable, which is also the length of the first period of time.

The transistor 21 was of the type BC 107, the diodes 23 and 24 were of the type BAW 62. The capacitor 20 had a capacitance value of 2.2 μF and the resistors 22 and 25 had a value of 1K Ω and 47 KΩ respectively. The second period of time was approximately 25 msec.

FIG. 2 shows a further elaboration of the logarithmic converter 9 having the previously mentioned input and output 10 and 11, respectively. The logarithmic converter 9 comprises an operational amplifier 30 whose non-inverting input is connected to ground and whose inverting input is connected on the one hand via a resistor 31 to the input 10 and on the other hand to the collector of a transistor 33. The emitter of the transistor 33 is connected on the one hand via a resistor 35 to the output of the operational amplifier 30 and on the other hand to the output 11. The base of the transistor 33 is connected to ground, the collector via a collector resistor 34 to a supply voltage.

The output of the operational amplifier 30 is coupled via a protection diode 32 to its inverting input. At negative input voltages at the input 10 this protection diode 32 limits the current through the transistor 33, so that damaging this transistor 33 by an excessive current passage is prevented. The resistor 35 has for its function to stabilise the operational amplifier 30.

The operational amplifier 30 functions with the resistor 31 as a voltage-controlled current source whose output current I is determined by the quotient of the input voltage $V_i$ and the resistance value R of the resistor 31, namely $V_i/R$. This output current I flows through the collector-emitter path of the transistor 33 and produces a base-emitter voltage $V_{be}$. As mentioned previously, the relation is a logarithmic relation and may be written as $V_{be}$ $V_T$ ln $(I/I_o)$ wherein $V_T$ and $I_o$ are constants. At normal ambient temperatures $V_T$ is approximately 26 mV, $I_o$ is equal to the value of the saturation current of the transistor 33.

If the input voltage $V_i$ increases by a factor of e, the current I also increases by a factor of e and the voltage $V_{be}$ changes by a value of 26 mV. As the output voltage is equal to the emitter-base voltage $V_{eb}$ such an increase in the input voltage $V_i$ results in a decrease, which has a value of 26 mV, of the output voltage at the output 11.

In a practical implementation the transistor 33 was of the type BC 107, the operational amplifier 30 of the type TBA 221 and the diode 32 of the type BAW 62. The resistors 31, 34 and 35 had a value of 27 KΩ, 150 KΩ and 33 KΩ, respectively.

FIG. 3 shows a second FM-receiver wherein elements whose function corresponds to the elements of the FM-receiver of FIG. 1 have been given the same reference numerals. The FM-receiver shown comprises a stereo decoder 4' which supplies at an output 5' the sum signal (L+R) of a stereo signal and at an output 6' the difference signal (L−R) thereof. The output 5' is coupled via the control input terminal 41 to an adder circuit 52 and to a difference circuit 53. Via the source and drain of the FET 27, the output 6' is also coupled to the adder circuit 52 as well as to the difference circuit 53. The sum of the sum signal (L+R) and the difference signal (L−R) and the difference of the sum signal (L+R) and the difference signal (L−R), respectively, are determined in these circuits, which results in a left-hand signal 2L and a right-hand signal 2R which, after amplification, can be reproduced separately via the loudspeakers 28 and 29, respectively.

In the absence of sound attacks the signal impedance between the source and drain of the FET 27 is at its maximum, so that the passage of the difference signal (L−R) is blocked, and a mono reproduction takes place, the sum signal (L+R) being reproduced by means of both loudspeakers 28 and 29.

If an attack is detected in the previously described manner the signal impedance between the source and drain of the FET 27 is minimised in a transient manner, so that the difference signal (L−R) in the adder circuit 52 is added to the sum signal (L+R) and subtracted therefrom in the difference circuit 53, which results in a stereophonic reproduction. By further varying said signal impedance in the same manner as in the noise reduction circuit 40 of FIG. 1 a corresponding stereo-mono change-over is obtained.

What is claimed is:

1. A noise reduction circuit for stereo signals comprising a control input terminal and first and second outputs, an amplitude detector connected to said control input terminal, a differentiator connected to said amplitude detector, and a controllable coupling circuit having a control input connected to said differentiator, said controllable coupling circuit being coupled to said first and second outputs for controlling the mutual signal coupling between said outputs, wherein said controllable coupling circuit minimizes said signal coupling when the amplitude of the output signal of the amplitude detector increases, and then automatically maximizes the signal coupling after the amplitude increase has ended.

2. A noise reduction circuit as claimed in claim 1, which further comprises a control signal shaper, having a threshold, coupled between the differentiator and a control input of the controllable coupling circuit for producing a control signal when its threshold voltage is exceeded, which control signal activates the controllable coupling circuit and adjusts the signal coupling from a maximum level to a minimum level, said control signal shaper further maintains the coupling, during at least a first period of time, at the minimum level and adjusts the signal coupling back, during at least a second period of time, from the minimum level to the maximum level, said periods of time corresponding to at least a number of times the period of the lowest signal frequency in the stereo signals, and their sum being at least 10 msec.

3. A noise reduction circuit as claimed in claim 2, wherein the control signal shaper comprises a cascade arrangement of a voltage comparison circuit having a voltage reference source for forming a threshold voltage, a monostable multivibrator for producing, when the threshold voltage is exceeded, a control pulse having a pulse duration corresponding to the first period of time, an output of the monostable multivibrator being provided with a parallel capacitor, and a controllable current source for discharging the capacitor during the second period of time, the output of the monostable multivibrator being connected to the control input of the controllable coupling circuit.

4. A noise reduction circuit as claimed in any of the preceding claims, wherein a logarithmic converter is connected between the amplitude detector and the differentiator, whereby said logarithmic converter supplies an output signal whose amplitude variation is in a logrithmic relationship to the amplitude variation of the input signal applied to the logarithmic converter.

5. A noise reduction circuit as claimed in claim 4, wherein the logarithmic converter comprises a voltage-controlled current source connected to the amplitude detector, an output of the current source being shunted by means of a semiconductor junction, which semiconductor junction is arranged in parallel with an input of the differentiator.

6. A noise reduction circuit as claimed in claims 1, 2 or 3, wherein the input signal of the amplitude detector is the sum signal of the left hand and the right hand sound signal of the stereo signals.

7. A noise reduction circuit as claimed in claims 1, 2, or 3, wherein said signal coupling between the two outputs is constant and minimal below a fixed threshold frequency and controllable for frequencies thereabove.

* * * * *